May 5, 1936.  C. H. HAPGOOD  2,039,958

MILKING MACHINE PULSATOR

Filed May 24, 1932

INVENTOR

Cyrus Howard Hapgood

BY

Busser and Harding
ATTORNEYS.

WITNESS:
Rob R Kitchel.

Patented May 5, 1936

2,039,958

UNITED STATES PATENT OFFICE 2,039,958

MILKING-MACHINE PULSATOR

Cyrus Howard Hapgood, Nutley, N. J., assignor to The De Laval Separator Company, New York, N. Y., a corporation of New Jersey Application May 24, 1932, Serial No. 613,219

4 Claims. (Cl. 31—61)

The object of the invention is to provide an inexpensive but efficient milking machine pulsator. Another object of the invention is to insure the connection of the inflation chambers of the teat cups with pneumatic pressure and exhaust for predetermined time intervals, which will ordinarily be equal time intervals.

A preferred embodiment of the invention is shown in the drawing, wherein—

Figure 1:
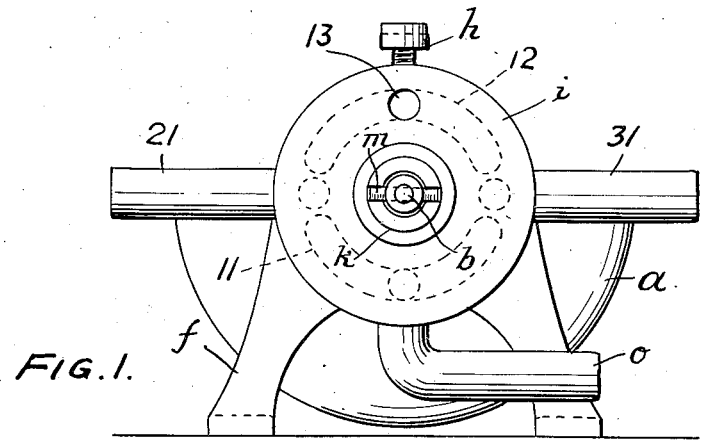
Fig. 1 is a front view of my invention, shown with the front cap removed.
Figure 2:
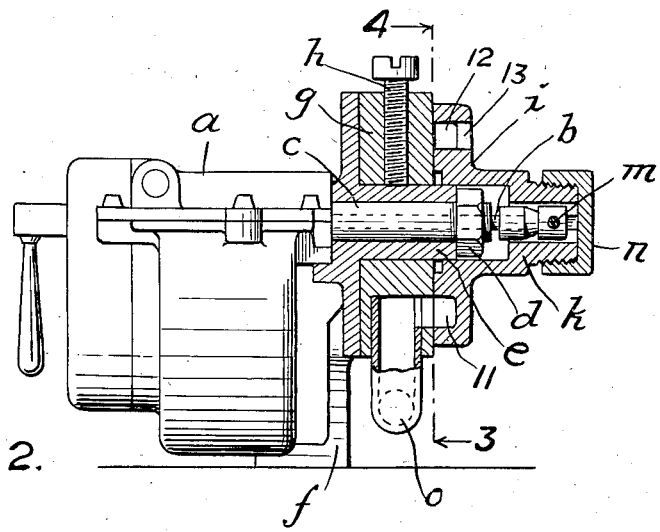
Fig. 2 is a side view, principally in central section.
Figure 3:
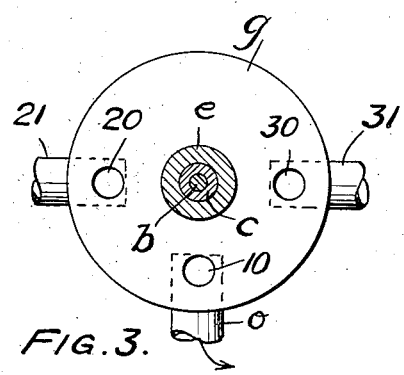
Fig. 3 is a section on line 3, Figure 2, showing the face of the valve seat.
Figure 4:
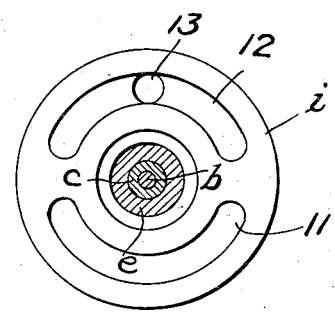
Fig. 4 is a section on line 4, Figure 2, showing the face of the valve.

The specific pulsator shown in the drawing and hereinafter described is intended for use in that system of milking wherein the inflation chambers of two of a set of four teat cups are connected with a source of relatively high absolute pneumatic pressure (conveniently the atmosphere) while simultaneously the inflation chambers of the other two teat cups are connected with a source of relatively low absolute pneumatic pressure (say 15 inches mercury absolute), the connections being then reversed, and so on alternately. The specific pulsator shown and described is also applicable to a system wherein the inflation chambers of one set of teat cups are connected with high pressure while the inflation chambers of another set of teat cups are connected with low pressure, the connections being then reversed and so on alternately. The pulsator shown and described may be somewhat simplified if it is desired to operate only a single set of teat cups and to connect the inflation chambers of all the teat cups simultaneously with high or low pressure, or to pulsate a secondary (claw) pulsator which controls the teat cup pulsations.

I have found it feasible to operate my improved pulsator by means of that simplified and inexpensive type of vacuum-operated oscillating motor which is utilized to operate oscillating windshield wipers with which automobiles are customarily equipped. This type of motor is a well known commercial type and is not only about the most inexpensive type of motor on the market, but the power required to operate it is very slight. In the pulsator shown in the drawing, such a motor $a$ has a shaft $b$, which turns in a sleeve bearing $c$, which, by means of a lock nut $d$, is held in fixed relation with a sleeve $e$ of a bracket $f$ supported in any manner in a fixed position.

Surrounding the sleeve $e$ and abutting against the face of the main frame of the bracket $f$ is a valve block $g$, which is held in fixed relation with the bracket by means of a set screw $h$ extending through the valve block $g$ and abutting against the sleeve $e$.

One face of the valve block $g$ forms a seat for a disc-shaped valve $i$ turnable on the sleeve $e$ and having a hollow hub $k$ which is keyed to the motor shaft $b$ by means of a driving pin $m$. A valve cap $n$ is screwed onto the end of the hollow hub $k$ and forms an end closure therefor to enclose and protect the bearings and driving connection.

Secured to the valve casing $g$ is a vacuum tube $o$, which is connected with a source of partial vacuum and communicates with a port 10 in the face of the valve casing constituting the valve seat. The valve casing $g$ is also provided with an air pulsation port 20 connecting (for example) with a tube 21 communicating with the pulsation chambers of two teat cups of a set, and with an air or pulsation port 30 connecting (for example) with a tube 31 communicating with the pulsation chambers of the other two teat cups of a set. The two ports are 180° apart. Instead of connecting the air ports 20 and 30 direct with the pulsation chambers of the teat cups, one port may be omitted and the other port may be connected with the valve chamber of a claw, the operation of the valve in this chamber being controlled by the pneumatic pulsations communicated through such port, the valve producing pulsations in the pulsation chambers of the teat cups; this principle of construction being shown in the Leitch Patent No. 1,255,186, February 5, 1918. Or one of the ports 20 and 21 may be omitted and the other connected with all the pulsation chambers of a set of teat cups. Various other connections may be established in accordance with known milking systems.

Valve $i$ is provided with two arcuate recesses 11 and 12. The recesses are positioned in opposite half circles of the valve and each is of a length sufficiently shorter than 180° to enable the ends of both recesses, when the valve is in neutral position, to clear the ports 20 and 30. One of the recesses (12) communicates with a port 13 open to the atmosphere.

When the motor is operated it oscillates the valve $i$ through an arc of about 140°, or about 70° in each direction beyond the neutral position shown. Assume that the valve is first turned in a clockwise direction 70° from the neutral position shown and is then reversed to turn in an anti-clockwise direction 140°, then in a clockwise direction 140° and so on. During each complete clockwise movement of the valve, port 20 is connected, through recess 12 and port 13 with the atmosphere during a half, or 70°, turn of the valve, and is then connected, through recess 11 and port 10, with vacuum during the other half turn of the valve. During each anti-clockwise movement of the valve, port 20 remains connected, through recess 11 and port 10, with vacuum during the first half turn of the valve, and is then connected, through recess 12 and port 13, with the atmosphere during the other half turn of the valve. If the milking system is one wherein port 30 is utilized, this port is connected with atmosphere while port 20 is connected with vacuum, and vice versa.

One objection to the use of a motor of the type described for producing pneumatic pulsations in a milking machine is that the motor cannot be depended upon to oscillate in opposite directions during equal time intervals. Usually it turns in one direction faster than in the other and the difference in the two time intervals is uncertain. However, in the construction comprising my invention, this uncertain irregularity of the operation of the motor does not result in any difference in the durations of the high pressure and low pressure pulsations through either port 20 or 30. Assuming that the speed is greater in the clockwise movement of the valve than in its anti-clockwise movement, it is clear that port 20 will connect with the air port 13 during a slow half anti-clockwise turn of the valve and then during a rapid clockwise half turn of the valve, and will connect with the vacuum port 10 through a rapid clockwise half turn of the valve and then through a slow anti-clockwise half turn of the valve. Thus the time intervals of connection of pulsation port 20 with vacuum and atmosphere will be equal, regardless of the inequality in the speed of the valve while turning in opposite directions. This operation, of course, applies to port 30, if such a port be used; and the high pressure intervals of both ports 20 and 30 will be the same, and the low pressure intervals of both ports will be the same.

The valve block may be integral with the bracket; but since the hole for the driving pin $m$ may not be definitely positioned in the motor, it is desirable, if not necessary, that the valve block be adjustable in a circumferential direction so as to properly position the valve block relative to the valve.

It is sometimes desirable not to equalize the periods of connection of the pulsation port with high pressure and with low pressure, but to provide, for example, for a relatively long high pressure period and a relatively short low pressure period. This result may be readily accomplished by the adjustment of the valve block $g$ by loosening and tightening the set-screw $h$.

What I claim and desire to protect by Letters Patent is:

1. A pulsator for milking machines comprising an oscillating motor, an oscillating valve connected to and operated by the motor, a valve block having a valve seat and provided with a vacuum port opening in the valve seat, the valve having two opposite arcuate recesses one of which constantly communicates with only said vacuum port, the pulsator having an air port, the other recess being in constant communication with only the air port, the valve block having a pulsation port so positioned that it registers with one valve recess during the latter part of the movement of the valve in one direction and during the first part of the movement of the valve in the other direction, while it registers with the other valve recess during the latter part of the movement of the valve in the last named direction and during the first part of the movement of the valve in the first named direction, whereby the time intervals of high and low pressure pneumatic pulsation may be definitely predetermined regardless of inequality in the two semi-oscillatory periods of the motor and valve.

2. A pulsator for milking machines comprising an oscillating motor, an oscillating valve connected to and operated by the motor, a valve block having a valve seat and provided with a vacuum port opening in the valve seat, the valve having two opposite arcuate recesses one of which constantly communicates with only said vacuum port, the pulsator having an air port, the other recess being in constant communication with only the air port, the valve block having two pulsation ports positioned approximately 180° apart and each adapted, at each movement of the valve in one direction, to connect first with one recess and then with the other recess and at each movement of the valve in the reverse direction to maintain connection with the second recess and then re-establish connection with the first recess, the specified positions of the pulsation ports being such that while one pulsation port connects with one recess the other pulsation port connects with the other recess.

3. A pulsator for milking machines comprising an oscillating motor and a valve driven by the motor and partaking of its oscillations, a valve block provided with a pulsation port, said pulsator also having a vacuum port and an air admission port, the valve having passages in constant communication with only the vacuum port and air admission port respectively and adapted to connect the pulsation port alternately with the vacuum port and with the air admission port and, at a definite place along each oscillatory stroke of the valve, to reverse said connection, and means to adjust the valve block in a circumferential direction to predetermine the place along each oscillatory stroke of the valve at which said connection is reversed.

4. A pulsator for milking machines which comprises an oscillating motor, an oscillatory valve driven by the motor and partaking of its oscillations, a valve block, a pulsation port, a vacuum port and an air admission port, the valve having arcuate passages in constant communication with only the vacuum port and air admission port respectively, said passages being so positioned relative to said pulsation port that during the movement of the valve in each direction one passage continuously communicates with the pulsation port throughout a definite part of the arc traversed by the valve in each direction and the other passage continuously communicates with the pulsation port throughout substantially the remaining part of the arc traversed by the valve in each direction, whereby differences in the time intervals of opposite movements of the motor and valve do not affect the duration of the high pressure and low pressure pulsations through the pulsation port.

CYRUS HOWARD HAPGOOD.